US005985976A

United States Patent [19]

Wartenberg et al.

[11] Patent Number: 5,985,976

[45] Date of Patent: Nov. 16, 1999

[54] METHOD OF MAKING A CONDUCTIVE POLYMER COMPOSITION

[75] Inventors: Mark F. Wartenberg; John G. Lahlouh, both of San Jose; James Toth, San Carlos, all of Calif.

[73] Assignee: Raychem Corporation, Menlo Park, Calif.

[21] Appl. No.: 08/968,634

[22] Filed: Nov. 12, 1997

Related U.S. Application Data

[62] Division of application No. 08/789,962, Jan. 30, 1997, Pat. No. 5,747,147, which is a continuation of application No. 08/408,769, Mar. 22, 1995, abandoned.

[51] Int. Cl.$^{6}$ .............................. C08K 3/00

[52] U.S. Cl. .............................. 524/495; 524/496

[58] Field of Search .............................. 524/495, 496

[56] References Cited

U.S. PATENT DOCUMENTS

| | | | |
|---|---|---|---|
| 3,243,753 | 3/1966 | Kohler | 338/31 |
| 3,351,882 | 11/1967 | Kohler et al. | 338/322 |
| 3,976,600 | 8/1976 | Meyer | 252/511 |
| 4,237,441 | 12/1980 | Van Konynenburg et al. | 338/22 R |
| 4,388,607 | 6/1983 | Toy et al. | 338/22 SD |
| 4,534,889 | 8/1985 | Van Konynenburg et al. | 252/511 |
| 4,545,926 | 10/1985 | Fouts et al. | 252/511 |
| 4,560,498 | 12/1985 | Horsma et al. | 252/511 |
| 4,591,700 | 5/1986 | Sopory | 219/505 |
| 4,689,475 | 8/1987 | Matthiesen | 219/553 |
| 4,724,417 | 2/1988 | Au et al. | 338/22 R |
| 4,774,024 | 9/1988 | Deep et al. | 252/511 |
| 4,800,253 | 1/1989 | Kleiner et al. | 219/553 |
| 4,935,156 | 6/1990 | Van Konynenburg et al. | 219/553 |
| 5,049,850 | 9/1991 | Evans et al. | 338/22 R |
| 5,089,801 | 2/1992 | Chan et al. | 338/22 R |
| 5,174,924 | 12/1992 | Yamada | 252/511 |
| 5,250,228 | 10/1993 | Baigrie et al. | 252/511 |
| 5,378,407 | 1/1995 | Chandler et al. | 252/513 |
| 5,436,609 | 7/1995 | Chan et al. | 338/22 R |
| 5,451,919 | 9/1995 | Chu et al. | 338/22 R |
| 5,801,612 | 9/1998 | Chandler et al. | 338/22 R |

FOREIGN PATENT DOCUMENTS

| | | | |
|---|---|---|---|
| 0 224 903 | 6/1987 | European Pat. Off. | H01C 7/02 |
| 49-82734 | 8/1974 | Japan . | |
| 49-82735 | 8/1974 | Japan . | |
| 49-82736 | 8/1974 | Japan . | |
| WO 94/01876 | 1/1994 | WIPO | H01C 1/14 |
| WO 95/01642 | 1/1995 | WIPO | H01C 7/02 |

OTHER PUBLICATIONS

D. Bulgin, "Electrically Conductive Rubber", *Transactions I.R.I.,* vol. 21, pp. 181–218 (1945). See, in particular, p. 196.

J. Meyer, "Glass Transition Temperature as a Guide to Selection of Polymers Suitable for PTC Materials", *Polymer Engineering and Science,* vol. 13, No. 6, pp. 462–468, Nov. 1973.

J. Meyer, "Stability of Polymer Composites as Positive–Temperature–Coefficient Resistors", *Polymer Engineering and Science,* vol. 14, No. 10, pp. 706–716, Oct. 1974.

Search Report for International application No. PCT/US96/03475, mailed Oct. 2, 1996.

U.S. application No. 07/910,950, Graves et al., filed Jul. 9, 1992.

U.S. application No. 08/121,717, Siden et al., filed Sep. 15, 1993.

U.S. application No. 08/242,916, Zhang et al., filed May 13, 1994.

U.S. application No. 08/255,497, Chu et al., filed Jun. 8, 1994.

U.S. application No. 08/255,584, Chandler et al., filed Jun. 8, 1994.

*Primary Examiner*—Edward J. Cain

*Attorney, Agent, or Firm*—Marguerite E. Gerstner; Herbert G. Burkard

[57] ABSTRACT

A conductive polymer composition which has a resistivity at 20° C. of at most 1.0 ohm-cm and a PTC anomaly of at least 104 contains at most 64% by volume of a crystalline polymeric component and at least 36% by volume of a particulate conductive filler. A preferred conductive filler is carbon black having a DBP number of 60 to 120 cm$^3$/100 g. Compositions of the invention, as well as other conductive polymer compositions are preferably prepared by a method in which the polymeric component and the filler are blended in a first step at a temperature greater than the melting temperature of the polymer, the mixture is then cooled, and the mixture is then mixed in a second step. The resulting composition has a PTC anomaly that is at least 1.2 times the PTC anomaly of the first mixture.

9 Claims, 1 Drawing Sheet

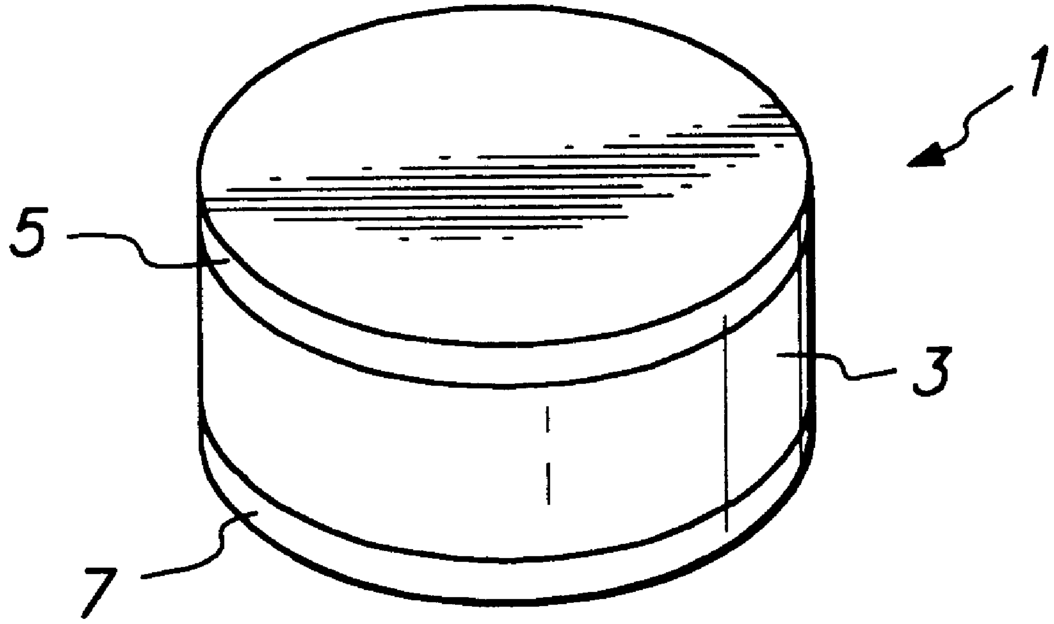
FIGURE

METHOD OF MAKING A CONDUCTIVE POLYMER COMPOSITION

CROSS-REFERENCE TO RELATED APPLICATIONS

This application is a divisional application of, commonly assigned application Ser. No. 08/789,962, filed Jan. 30, 1997 now U.S. Pat. No. 5,747,147, which is a file wrapper continuation of application Ser. No. 08/408,769, filed Mar. 22, 1995, now abandoned, the disclosure of each of which is incorporated herein by reference.

BACKGROUND OF THE INTENTION

1. Field of the Invention

This invention relates to conductive polymer compositions and electrical devices comprising such compositions.

2. Introduction to the Invention

Conductive polymer compositions and electrical devices comprising them are well-known. Such compositions comprise a polymeric component, and dispersed therein, a particulate conductive filler such as carbon black or metal. Conductive polymer compositions are described in U.S. Pat. Nos. 4,237,441 (van Konynenburg et al), 4,388,607 (Toy et al), 4,534,889 (van Konynenburg et al), 4,545,926 (Fouts et al), 4,560,498 (Horsma et al), 4,591,700 (Sopory), 4,724,417 (Au et al), 4,774,024 (Deep et al), 4,935,156 (van Konynenburg et al), 5,049,850 (Evans et al), 5,250,228 (Baigrie et al), and 5,378,407 (Chandler et al), and in pending U.S. application Ser. Nos. 08/085,859 (Chu et al, filed Jun. 29, 1993 , now U.S. Pat. No. 5,451,919), and 08/255,497 (Chu et al, filed Jun. 8, 1994), now U.S. Pat. No. 5,582,770. The disclosure of each of these patents and applications is incorporated herein by reference.

Such compositions often exhibit positive temperature coefficient (PTC) behavior, i.e. they increase in resistivity in response to an increase in temperature, generally over a relatively small temperature range. The temperature at which this increase occurs is the switching temperature $T_s$ and may be defined as the temperature at the intersection point of extensions of the substantially straight portions of a plot of the log of the resistance of a PTC element against temperature that lie on either side of the portion of the curve showing a sharp change in slope. The increase from the resistivity at 20° C. ($\rho_{20}$) to a peak resistivity ($\rho_{peak}$, i.e. the maximum resistivity that the composition exhibits above $T_s$ or the resistivity that the composition exhibits at a specified temperature above $T_s$) is the PTC anomaly height.

PTC conductive polymer compositions are particularly suitable for use in electrical devices such as circuit protection devices, heaters, and sensors that respond to changes in ambient temperature, current, and/or voltage conditions. For circuit protection device applications it is desirable that the composition have as low a resistivity and as high a PTC anomaly height as possible. A low resistivity allows preparation of small devices that have low resistance. Such devices need little space on a printed circuit board or other substrate and contribute little resistance to an electrical circuit during normal operation. In addition, because irradiation, heat treatment, and other processing steps that are often part of the preparation of the device increase resistance, a low resistivity material is desirable. A high PTC anomaly height allows the device to withstand the necessary applied voltage. The resistivity of a conductive polymer composition can be decreased by adding more conductive filler, but this generally reduces the PTC anomaly. A possible explanation for the reduction of the PTC anomaly is that the addition of more conductive filler (a) decreases the amount of crystalline polymer which contributes to the PTC anomaly, or (b) physically reinforces the polymeric component and thus decreases the expansion at the melting temperature.

SUMMARY OF THE INVENTION

We have now discovered that compositions that have a low resistivity, i.e. less than 1.0 ohm-cm, and a high PTC anomaly, i.e. a change in resistivity of at least $10^4$, can be made by mixing a relatively high quantity of a specific carbon black with a crystalline polymer. Thus in a first aspect, this invention discloses a composition which comprises (1) at most 64% by volume of the total composition of a polymeric component having a crystallinity of at least 20% and a melting point $T_m$, and (2) at least 36% by volume of the total composition of a particulate conductive filler which comprises carbon black, said carbon black having a DBP number of 60 to 120 $cm^3$/100 g, said composition having (a) a resistivity at 20° C., $\rho_{20}$, of at most 1.0 ohm-cm, and (b) a PTC anomaly from 20° C. to ($T_m$+5° C.) of at least $10^4$.

In a second aspect, this invention discloses an electrical device, e.g. a circuit protection device, which comprises (A) a resistive element composed of a conductive polymer composition according to the first aspect of the invention; and (B) two electrodes which are attached to the resistive element and can be connected to a source of electrical power, the device having (a) a resistance at 20° C., $R_{20}$, of at most 1.0 ohm, (b) a resistivity at 20° C., $\rho_{20}$, of at most 1.0 ohm-cm, and (c) a PTC anomaly from 20° C. to ($T_m$+5° C.) of at least ohm.

We have also found that particular advantages in terms in compositions with enhanced PTC anomaly at a given carbon black loading can be achieved by mixing the composition more than time under conditions that expose the composition to a temperature higher than that of the melting point of the polymeric component. Thus in a third aspect, this invention discloses a method of making a conductive polymer composition which (1) has a resistivity at 20° C. of less than 100 ohm-cm, and (2) comprises (i) a polymeric component having a melting point $T_m$ and (ii) a particulate conductive filler, said method comprising (A) blending the polymeric component and the filler in a first step at a temperature greater than $T_m$ to form a first mixture having a specific energy consumption $S_1$ and a PTC anomaly from 20° C. to ($T_m$+5° C.) $PTC_1$, (B) cooling the first mixture, and (C) mixing the first mixture in a second step at a temperature greater than $T_m$ to give a final mixture having a specific energy consumption which is at least $1.2S_1$ and a PTC anomaly from 20° C. to ($T_m$+5° C.) that is at least $1.2PTC_1$.

BRIEF DESCRIPTION OF THE DRAWING

The FIGURE is a plan view of an electrical device of the invention.

DETAILED DESCRIPTION OF THE INVENTION

The polymeric component of the composition comprises one or more crystalline polymers and has a crystallinity of at least 20%, preferably at least 30%, particularly at least 40%, as measured by a differential scanning calorimeter. For some applications it may be desirable to blend the crystalline polymer(s) with one or more additional polymers, e.g. an elastomer or an amorphous thermoplastic polymer, in order to achieve specific physical or thermal properties, e.g. flexibility or maximum exposure temperature. It is preferred that the polymeric component comprise polyethylene, e.g. high density polyethylene, medium density polyethylene, low density polyethylene, linear low density polyethylene, or a mixture of two or more of these polyethylenes. High density polyethylene that has a density of at least 0.94 g/cm$^3$, generally 0.95 to 0.97 g/cm$^3$, is particularly preferred. The polymeric component comprises at most 64% by volume, preferably at most 62% by volume, particularly at most 60% by volume, especially at most 58% by volume of the total volume of the composition. The polymeric component has a melting temperature, as measured by the peak of the endotherm of a differential scanning calorimeter, of $T_m$. When there is more than one peak, $T_m$ is defined as the temperature of the highest temperature peak. Preferred high density polyethylene has a melting temperature of about 135° C.

Dispersed in the polymeric component is a particulate conductive filler that comprises carbon black. For some applications, other particulate conductive materials such as graphite, metal, metal oxide, conductive coated glass or ceramic beads, particulate conductive polymer, or a combination of these, may also be present. Such particulate conductive fillers may be in the form of powder, beads, flakes, or fibers. It is preferred, however, that the particulate filler consist essentially of carbon black that has a DBP number of 60 to 120 cm$^3$/100 g, preferably 60 to 100 cm$^3$/100 g, particularly 60 to 90 cm$^3$/100 g, especially 65 to 85 cm$^3$/100g. The DBP number is an indication of the amount of structure of the carbon black and is determined by the volume of n-dibutyl phthalate (DBP) absorbed by a unit mass of carbon black. This test is described in ASTM D2414-93, the disclosure of which is incorporated herein by reference. The quantity of conductive filler needed is based on the required resistivity of the composition and the resistivity of the conductive filler itself. For compositions of the invention, the conductive filler comprises at least 36% by volume, preferably at least 38% by volume, particularly at least 40% by volume of the total volume of the composition.

The conductive polymer composition may comprise additional components, such as antioxidants, inert fillers, non-conductive fillers, radiation crosslinking agents (often referred to as prorads or crosslinking enhancers), stabilizers, dispersing agents, coupling agents, acid scavengers (e.g. $CaCO_3$), or other components. These components generally comprise at most 20% by volume of the total composition.

The composition has a resistivity at 20° C., $\rho_{20}$, of at most 100 ohm-cm, preferably at most 10 ohm-cm, particularly at most 5 ohm-cm, more particularly at most 1.0 ohm-cm, especially at most 0.9 ohm-cm, more especially at most 0.8 ohm-cm.

The composition exhibits positive temperature coefficient (PTC) behavior, i.e. it shows a sharp increase in resistivity with temperature over a relatively small temperature range. The term "PTC" is used to mean a composition or device that has an $R_{14}$ value of at least 2.5 and/or an $R_{100}$ value of at least 10, and it is preferred that the composition or device should have an $R_{30}$ value of at least 6, where $R_{14}$ is the ratio of the resistivities at the end and the beginning of a 14° C. range, $R_{100}$ is the ratio of the resistivities at the end and the beginning of a 100° C. range, and $R_{30}$ is the ratio of the resistivities at the end and the beginning of a 30° C. range. Compositions of the invention show a PTC anomaly at at least one temperature over the range from 20° C. to ($T_m$+5° C.) of at least $10^4$, preferably at least $10^{4.5}$, particularly at least $10^5$, especially at least $10^{5.5}$, i.e. the log[resistance at ($T_m$+5° C.)/resistance at 20° C.] is at least 4.0, preferably at least 4.5, particularly at least 5.0, especially at least 5.5. If the maximum resistance is achieved at a temperature $T_x$ that is below ($T_m$+5° C.), the PTC anomaly is determined by the log(resistance at $T_x$/resistance at 20° C.). In order to ensure that effects of processing and thermal history are neutralized, at least one thermal cycle 20° C. to ($T_m$+5° C.) and back to 20° C. should be conducted before the PTC anomaly is measured.

While dispersion of the conductive filler and other components in the polymeric component may be achieved by any suitable means of mixing, including solvent-mixing, it is preferred that the composition be melt-processed using melt-processing equipment including mixers made by such manufacturers as Brabender, Moriyama, and Banbury, and continuous compounding equipment, such as co- and counter-rotating twin screw extruders. Prior to mixing, the components of the composition can be blended in a blender such as a Henschel™ blender to improve the uniformity of the mixture loaded into the mixing equipment. Compositions of the invention can be prepared by using a single melt-mixing step, but preferably they are made by a method in which there are two or more mixing steps. Each mixing step requires that the composition be mixed at a temperature greater than $T_m$. It is preferred that the mixing temperature be as low as possible, e.g. at a temperature at most ($T_m$+100° C.), preferably at most ($T_m$+50° C.), particularly at most ($T_m$+30° C.). Between each mixing step the composition is cooled to a temperature that is at most ($T_m$−30° C.), preferably at most ($T_m$−40° C.), e.g. room temperature. During or after the cooling step the composition can be granulated, powdered, pulverized or otherwise comminuted to improve the ease of adding it to the mixing equipment for the next mixing step. During each mixing step the specific energy consumption (SEC), i.e. the total amount of work in MJ/kg that is put into the composition during the mixing process, is recorded. The total SEC for a composition that has been mixed in two or more steps is the total of each of the steps. Thus the polymeric component and the filler, as well as any additional components, are mixed in a first step at a temperature greater than $T_m$ to form a first mixture that has a specific energy consumption $S_1$. After the first mixture is cooled it is mixed in a second step at a temperature greater than $T_m$. The SEC of the composition after the second step is at least $1.2S_1$, preferably at least $1.3S_1$, particularly at least $1.5S_1$. The PTC anomaly of the composition after the first step over the temperature range 20° C. to ($T_m$+5° C.) is $PTC_1$, while the PTC anomaly after the second step over the same range is at least $1.2PTC_1$, preferably at least $1.3PTC_1$, particularly at least $1.4PTC_1$. Between the first and the second steps the first mixture may be mixed at a temperature greater than $T_m$ and cooled one or more times, to give a total of three or more mixing steps. Such a multiple mixing process results in a composition that has a relatively low resistivity, i.e. less than 100 ohm-cm, preferably less than 10 ohm-cm, particularly less than 5 ohm-cm, especially less than 1.0 ohm-cm, while maintaining a suitably high PTC anomaly, i.e. at least $10^4$, preferably at least $10^{4.5}$, particularly at least $10^5$.

After mixing, the composition can be melt-shaped by any suitable method, e.g. melt-extrusion, injection-molding, compression-molding, and sintering, in order to produce a conductive polymer resistive element. For many applications, it is desirable that the composition be extruded into sheet from which the element may be cut, diced, or otherwise removed. The element may be of any shape, e.g. rectangular, square, circular, or annular. Depending on the intended end-use, the composition may undergo various processing techniques, e.g. crosslinking or heat-treatment, following shaping. Crosslinking can be accomplished by chemical means or by irradiation, e.g. using an electron beam or a $Co^{60}$ $\gamma$ irradiation source, and may be done either before or after the attachment of the electrode. A particularly preferred method, in which the devices are cut from a laminate before crosslinking, is disclosed in co-pending, commonly assigned, U.S. application Ser. No. 08/408,768 (Toth et al, filed, Mar. 22, 1995, now abandoned in favor of continuation application Ser. No. 08/798,887, filed Feb. 10, 1997, the disclosure of which is incorporated herein by reference. The level of crosslinking depends on the required application for the composition, but is generally less than the equivalent of 200 Mrads, and preferably is substantially less, i.e. from 1 to 20 Mrads, preferably from 1 to 15 Mrads, particularly from 2 to 10 Mrads. Such low crosslinking levels are particularly useful for applications in which a device is exposed to a relatively low voltage, i.e. less than 60 volts. We have found that with an increase in the amount of carbon black present in the composition, the amount of crosslinking required to achieve the maximum PTC anomaly decreases. Thus for electrical stability it is preferred that devices of the invention that contain at least 36% by volume carbon black are crosslinked to the equivalent of less than 10 Mrads.

The compositions of the invention may be used to prepare electrical devices, e.g. circuit protection devices, heaters, sensors, or resistors, in which an element composed of the conductive polymer composition is in physical and electrical contact with at least one electrode that is suitable for connecting the element to a source of electrical power. The type of electrode is dependent on the shape of the element, and may be, for example, solid or stranded wires, metal foils, metal meshes, or metallic ink layers. Electrical devices of the invention can have any shape, e.g. planar, axial, or dogbone, but particularly useful devices comprise two laminar electrodes, preferably metal foil electrodes, and a conductive polymer element sandwiched between them. Particularly suitable foil electrodes are disclosed in U.S. Pat. Nos. 4,689,475 (Matthiesen), 4,800,253 (Kleiner et al), and pending U.S. application Ser. No. 08/255,584 (Chandler et al, Jun. 8, 1994) now abandoned in favor of continuation application Ser. No. 08/672,496, filed Jun. 28, 1996, which was abandoned in favor of continuation application Ser. No. 08/816,471, filed Mar. 13, 1997). the disclosure of each of which is incorporated herein by reference. Additional metal leads, e.g. in the form of wires or straps, can be attached to the foil electrodes to allow electrical connection to a circuit. In addition, elements to control the thermal output of the device, e.g. one or more conductive terminals, can be used. These terminals can be in the form of metal plates, e.g. steel, copper, or brass, or fins, that are attached either directly or by means of an intermediate layer such as solder or a conductive adhesive, to the electrodes. See, for-example, U.S. Pat. No. 5,089,801 (Chan et al), and pending U.S. application Ser. No. 08/087,017 (Chan et al, filed Jul. 6, 1993). For some applications, it is preferred to attach the devices directly to a circuit board. Examples of such attachment techniques are shown in U.S. application Ser. Nos. 07/910,950 (Graves et al, filed Jul. 9, 1992) and 08/121,717 (side et al, filed Sep. 15, 1993), the disclosures of which are combined in continuation-in-part application Ser. No. 08/302,138 (filed Sep. 7, 1994), abandoned in favor of continuation application Ser. No. 08/727,869 (filed Oct. 8, 1996), which was abandoned in favor of continuation application Ser. No. 08/900,787 (filed Jul. 25, 1997), now U.S. Pat. No. 5,892,357, and Ser. No. 08/242,916 (Zhang et al, filed May 13, 1994), abandoned in favor of continuation application Ser. No. 08/710,925 (filed Sep. 24, 1996), now U.S. Pat. No. 5,831,510, and in International Application No. PCT/US93/06480 (Raychem Corporation, filed Jul. 8, 1993). The disclosure of each of these patents and applications is incorporated herein by reference.

Circuit protection devices generally have a resistance at 20° C., $R_{20}$, of less than 100 ohms, preferably less than 20 ohms, particularly less than 10 ohms, especially less than 5 ohms, most especially less than 1 ohm. The resistance is measured after one thermal cycle from 20° C. to ($T_m$+5° C.) to 20° C. For many applications, the resistance of the circuit protection device is much less than 1 ohm, e.g. 0.010 to 0.500 ohms. Heaters generally have a resistance of at least 100 ohms, preferably at least 250 ohms, particularly at least 500 ohms. When the electrical device is a heater, the resistivity of the conductive polymer composition is preferably higher than for circuit protection devices, e.g. $10^2$ to $10^5$ ohm-cm, preferably $10^2$ to $10^4$ ohm-cm.

The invention is illustrated by the drawing in which the FIGURE shows an electrical device 1 of the invention. Resistive element 3, composed of a conductive polymer composition, is sandwiched between two metal foil electrodes 5,7.

The invention is illustrated by the following examples, in which Examples 8 and 9 are comparative examples.

EXAMPLES 1 to 7

Sixty percent by volume powdered high density polyethylene (Petrothene™ LB832, available from USI, having a melting temperature of about 135° C.) was preblended in a Henschel™ blender with 40% by volume carbon black beads (Ravens™ 430 with a particle size of 82 nm, a structure (DBP) of 80 $cm^3$/100 g, and a surface area of 34 $m^2$/g, available from Columbian Chemicals), and the blend was then mixed for a mix increment ranging from 4 to 32 minutes in a 3.0 liter Moriyama mixer. The mixture was cooled, granulated, and, for Examples 2 to 4 and 6, remixed one or more times to give a total mix time as specified in Table I. The specific energy consumption (SEC) in MJ/kg, i.e. the total amount of work used during the compounding process, was recorded, and was cumulative for those compositions mixed more than once. The mixture was then compression-molded to give a sheet with a thickness of 0.64 to 0.76 mm (0.025 to 0.030 inch), and the sheet was then laminated between two layers of electrodeposited nickel foil having a thickness of about 0.033 mm (0.0013 inch) (available from Fukuda) using a press. The laminate was irradiated to 10 Mrads using a 3.0 MeV electron beam, and chips with a diameter of 12.7 mm (0.5 inch) were punched from the laminate. Devices were formed from each chip by soldering 20 AWG tin-coated copper leads to each metal foil by dipping the chips into a solder formulation of 63% lead/37% tin heated to 240 to 245° C. for about 2.5 to 3.0 seconds, and allowing the devices to air cool. The resistance versus temperature properties of the devices were determined by positioning the devices in an oven and measuring the resistance at intervals over the temperature range 20 to 160 to 20° C. Two temperature cycles were run. The resistivity at 20° C. for the second thermal cycle was calculated from the resistance and recorded as $\rho_{20}$. The height of the PTC anomaly was determined as log(resistance at 140° C./resistance at 20° C.) and recorded for the second cycle as $PTC_2$.

The results, shown in Table I, indicate that multiple mixing cycles produced an increase in resistivity, but a substantially larger increase in PTC anomaly.

TABLE I

| Example | 1 | 2 | 3 | 4 | 5 | 6 | 7 |
|---|---|---|---|---|---|---|---|
| Mix Increment (min) | 4 | 4 | 4 | 4 | 16 | 16 | 32 |
| Mix Cycles | 1 | 2 | 3 | 4 | 1 | 2 | 1 |
| Total Mix Time (min) | 4 | 8 | 12 | 16 | 16 | 32 | 32 |
| $\rho_{20}$ (Ω-cm) | 0.58 | 0.80 | 0.96 | 1.11 | 0.71 | 1.04 | 0.54 |
| log $PTC_2$ (decades) | 3.64 | 5.35 | 6.63 | 7.39 | 5.01 | 7.47 | 4.48 |
| SEC (MJ/kg) | 0.75 | 1.46 | 2.18 | 2.81 | 1.83 | 3.66 | 3.32 |

EXAMPLES 8 to 14

Powdered Petrothene LB832 was preblended with Raven 430 in the amounts shown by volume percent in Table II. The blend was then mixed using a 70 mm (2.75 inch) Buss kneader to form pellets. For Example 13, the pellets of Example 12 were passed through the Buss kneader a second time. For Example 14, the pellets of Example 13 were passed through the Buss kneader a third time. The pellets for each composition were extruded through a sheet die to give a sheet with a thickness of 0.25 mm (0.010 inch). The extruded sheet was laminated as in Example 1. Devices were then prepared by either Process C or D.

The resistance versus temperature properties of the devices were determined by following the procedure of Example 1. Resistivity values were calculated from the recorded resistance at 20° C. on the first and second cycles, $\rho_1$ and $\rho_2$, respectively. The height of the PTC anomaly was determined as log(resistance at 140° C./resistance at 20° C.) for the first and second cycles, and was recorded in decades as $PTC_1$ and $PTC_2$, respectively. The results, shown in Table II, indicate that compositions having a resistivity of less than 1 ohm-cm could be prepared at carbon black loadings of at least 38% by volume, and that although the resistivity increased with multiple mixing, the increase in the PTC anomaly was substantial.

Process C

The laminate was irradiated to 5 Mrads using a 3.0 MeV electron beam, and chips with a diameter of 12.7 mm (0.5 inch) were punched from the laminate. Devices were formed from each chip by soldering 20 AWG tin-coated copper leads to each metal foil by dipping the chips into a solder formulation of 63% lead/37% tin heated to 245° C. for about 1.5 seconds, and allowing the devices to air cool.

Process D

Chips with a diameter of 12.7 mm (0.5 inch) were punched from the laminate and leads were attached to form a device by soldering 20 AWG tin-coated copper leads to each metal foil. Soldering was conducted by dipping the chips into a solder formulation of 63% lead/37% tin heated to 245° C. for about 1.5 seconds, and allowing the devices to air cool. The devices were then irradiated to 5 Mrads using a 3.0 MeV electron beam.

TABLE II

| Example | 8 (Comparative) | 9 (Comparative) | 10 | 11 | 12 | 13 | 14 |
|---|---|---|---|---|---|---|---|
| CB (Vol %) | 32 | 34 | 36 | 38 | 40 | 40 | 40 |
| HDPE (Vol %) | 68 | 66 | 64 | 62 | 60 | 60 | 60 |
| SEC (MJ/kg) | 2.52 | 2.48 | 3.06 | 3.31 | 3.64 | 6.01 | 8.96 |
| Process C | | | | | | | |
| $\rho_1$ (ohm-cm) | 2.02 | 1.27 | 0.98 | 0.76 | 0.58 | 0.65 | 0.76 |
| $PTC_1$ (decades) | 7.30 | 6.36 | 5.81 | 5.04 | 3.95 | 4.89 | 5.25 |
| $\rho_2$ (ohm-cm) | 2.08 | 1.34 | 1.02 | 0.81 | 0.56 | 0.67 | 0.73 |
| $PTC_2$ (decades) | 7.89 | 6.69 | 6.19 | 5.25 | 4.08 | 5.09 | 5.49 |
| Process D | | | | | | | |
| $\rho_1$ (ohm-cm) | 1.48 | 1.05 | 0.83 | 0.70 | 0.53 | 0.63 | 0.65 |
| $PTC_1$ (decades) | 8.39 | 7.86 | 7.38 | 6.27 | 4.54 | 5.79 | 6.50 |
| $\rho_2$ (ohm-cm) | 2.27 | 1.47 | 1.09 | 0.86 | 0.60 | 0.71 | 0.76 |
| $PTC_2$ (decades) | 8.86 | 8.29 | 7.65 | 6.39 | 4.58 | 5.95 | 6.74 |

EXAMPLES 15 and 16

Petrothene LB832 and Raven 430 were mixed using a Buss kneader, extruded, and laminated as described in Example 8. Following Process C, above, devices were irradiated from 0 to 30 Mrads and leads were attached. The resistance versus temperature properties were measured as above and the resistivity at 20° C. for the second thermal cycle, $\rho_2$, and the PTC anomaly height for the second cycle, $PTC_2$, were recorded in Table III.

EXAMPLE 17

Fifty-five percent by volume Petrothene LB832 and 45% by volume Raven 430 were preblended in a Henschel blender and then mixed for 15 minutes in a 350 $cm^3$ Brabender mixer heated to 200° C. The compound was granulated, dried, and extruded into a tape with dimensions of 76×0.38 mm (3×0.015 inch) that was then laminated with electrodes. Devices were then prepared as in Examples 15 and 16. The results, shown in Table III, indicated that the optimum PTC anomaly was achieved at a lower beam dose as the amount of carbon black increased.

TABLE III

| | Example 15 36% CB | | Example 16 40% CB | | Example 17 45% CB | |
|---|---|---|---|---|---|---|
| Beam Dose (Mrads) | $\rho_2$ (Ω-cm) | log $PTC_2$ (decades) | $\rho_2$ (Ω-cm) | log $PTC_2$ (decades) | $\rho_2$ (Ω-cm) | log $PTC_2$ (decades) |
| 0 | 0.79 | 4.7 | 0.53 | 4.1 | 0.39 | 4.2 |
| 2.5 | | | 0.57 | 4.4 | 0.39 | 4.1 |
| 5 | 0.96 | 5.9 | 0.59 | 4.3 | 0.44 | 3.9 |
| 10 | 1.10 | 6.1 | 0.63 | 4.2 | 0.49 | 3.4 |
| 15 | 1.13 | 6.0 | | | | |
| 20 | 1.20 | 5.6 | | | | |
| 30 | 1.24 | 5.6 | | | | |

What is claimed is:

1. A method of making a conductive polymer composition which (1) has a resistivity at 20° C. of less than 100 ohm-cm, and (2) comprises (i) a polymeric component having a melting point $T_m$ and (ii) a particulate conductive filler, said method comprising (A) blending the polymeric component and the filler in a first step at a temperature greater than $T_m$ to form a first mixture having a specific energy consumption $S_1$ and a PTC anomaly from 20° C. to ($T_m$+5° C.) $PTC_1$, (B) cooling the first mixture, and (C) mixing the first mixture in a second step at a temperature greater than $T_m$ to give a final mixture having a specific energy consumption which is at least $1.2S_1$ and a PTC anomaly from 20° C. to ($T_m$+5° C.) that is at least $1.2PTC_1$.

2. A method according to claim 1 wherein after step (B) and before step (C) the first mixture is mixed at least one time at a temperature greater than $T_m$ and is then cooled.

3. A method according to claim 1 wherein the composition has a resistivity of less than 1 ohm-cm.

4. A method according to claim 1 wherein the polymeric component comprises polyethylene.

5. A method according to claim 1 wherein the particulate filler comprises carbon black.

6. A method according to claim 5 wherein the carbon black has a DBP number of 60 to 120 $cm^3/100$ g.

7. A method according to claim 1 wherein the blending in step (A) and the mixing in step (C) are conducted by melt-processing.

8. A method according to claim 1 wherein the final mixture has a specific energy consumption of at least $1.3S_1$.

9. A method according to claim 1 wherein the composition has a PTC anomaly of at least $10^4$.

* * * * *